US011023825B2

(12) United States Patent
Jan

(10) Patent No.: US 11,023,825 B2
(45) Date of Patent: Jun. 1, 2021

(54) PLATFORM AS A SERVICE CLOUD SERVER AND MACHINE LEARNING DATA PROCESSING METHOD THEREOF

(71) Applicant: Institute For Information Industry, Taipei (TW)

(72) Inventor: Kai-Yuan Jan, Taipei (TW)

(73) Assignee: Institute For Information Industry, Taipei (TW)

( * ) Notice: Subject to any disclaimer, the term of this patent is extended or adjusted under 35 U.S.C. 154(b) by 847 days.

(21) Appl. No.: 15/834,033

(22) Filed: Dec. 6, 2017

(65) Prior Publication Data
US 2019/0156245 A1 May 23, 2019

(30) Foreign Application Priority Data
Nov. 23, 2017 (TW) .................................. 106140755

(51) Int. Cl.
*G06N 99/00* (2019.01)
*G06F 9/455* (2018.01)
*H04L 29/08* (2006.01)
*G06N 20/00* (2019.01)

(52) U.S. Cl.
CPC ......... *G06N 20/00* (2019.01); *G06F 9/45558* (2013.01); *H04L 67/10* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,117,137 B2 * | 2/2012 | Xu | G06F 16/334 706/12 |
| 8,607,200 B2 * | 12/2013 | Kunze | G06F 9/44505 717/124 |
| 9,619,268 B2 * | 4/2017 | Beveridge | G06F 9/4451 |
| 9,626,225 B2 * | 4/2017 | Boss | H04L 47/745 |
| 9,691,034 B2 * | 6/2017 | Lee | G06N 20/00 |
| 9,720,784 B2 * | 8/2017 | Bernal | G06F 11/1461 |
| 10,270,841 B1 * | 4/2019 | Thomason | H04L 47/78 |
| 10,540,384 B2 * | 1/2020 | Maybee | G06F 16/9027 |
| 10,642,878 B2 * | 5/2020 | Kremer | G06F 16/9027 |
| 2008/0262984 A1 | 10/2008 | Xu et al. | |
| 2014/0344194 A1 | 11/2014 | Lee et al. | |

* cited by examiner

*Primary Examiner* — Umut Onat
(74) *Attorney, Agent, or Firm* — Skaar Ulbrich Macari, P.A.

(57) ABSTRACT

A PaaS cloud server receives a machine learning application resource request and determines an available logic circuit object accordingly. The PaaS cloud server creates a data compression and storing service object and pairs the data compression and storing service object and the logic circuit object. The PaaS cloud server binds the data compression and storing service object with a machine learning application, and receives a machine learning data from the machine learning application. The PaaS cloud server inputs the machine learning data into a part logic circuit of an FGPA circuit corresponding to the logic circuit object according to the pairing of the data compression and storing service object and the logic circuit object so that the part logic circuit compresses and stores the machine learning data. The PaaS cloud server returns information which relates to the compressed and stored data to the machine learning application.

8 Claims, 14 Drawing Sheets

```
┌─────────────────────────────────────────────────────────────┐
│ Receiving, by the PaaS cloud server, an ML application     │
│ resource request of a client via the DCS virtual machine    │
│                                                         701 │
└─────────────────────────────────────────────────────────────┘
                              ↓
┌─────────────────────────────────────────────────────────────┐
│ Determining, by the PaaS cloud server, that a first DCS    │
│ logic circuit object and a second DCS logic circuit object │
│ are available according to the ML application resource      │
│ request via the DCS virtual machine                    702  │
└─────────────────────────────────────────────────────────────┘
                              ↓
┌─────────────────────────────────────────────────────────────┐
│ Creating, by the PaaS cloud server, a first DCS service     │
│ object and a second DCS service object via the DCS object  │
│ management module and pair, by the PaaS cloud server, the  │
│ first DCS service object and the second DCS service object │
│ with the first DCS logic circuit object and the second     │
│ DCS logic circuit object respectively                  703  │
└─────────────────────────────────────────────────────────────┘
                              ↓
┌─────────────────────────────────────────────────────────────┐
│ Binding, by the PaaS cloud server, the first DCS service   │
│ object and the second DCS service object with an ML        │
│ application of the client via the DCS object management    │
│ module                                                 704  │
└─────────────────────────────────────────────────────────────┘
                              ↓
┌─────────────────────────────────────────────────────────────┐
│ Receiving, by the PaaS cloud server, an ML application     │
│ datum from the ML application via the DCS virtual machine   │
│                                                        705  │
└─────────────────────────────────────────────────────────────┘
                              ↓
┌─────────────────────────────────────────────────────────────┐
│ Dividing, by the PaaS cloud server, the ML application     │
│ datum into a first part ML application datum and a second  │
│ part ML application datum according to the first DCS       │
│ service object and the second DCS service object via the   │
│ DCS virtual machine                                    706  │
└─────────────────────────────────────────────────────────────┘
                              ↓
┌─────────────────────────────────────────────────────────────┐
│ Inputting, by the PaaS cloud server, the first part ML     │
│ application datum and the second part ML application datum │
│ into the first part logic circuit corresponding to the     │
│ first DCS service object and the second part logic circuit │
│ corresponding to the second DCS service object respectively│
│ via the DCS virtual machine according to the pairing of    │
│ the first DCS service object with the first DCS logic      │
│ circuit object and the pairing of the second DCS service   │
│ object with the second DCS logic circuit object       707  │
└─────────────────────────────────────────────────────────────┘
                              ↓
┌─────────────────────────────────────────────────────────────┐
│ Transmitting, by the PaaS cloud server, the first ML data  │
│ storage information and the second ML data storage         │
│ information to the ML application via the DCS virtual      │
│ machine                                                708  │
└─────────────────────────────────────────────────────────────┘
```

FIG. 7

Receiving, by the PaaS cloud server, an ML application resource request of a client via the DCS virtual machine  801

Determining, by the PaaS cloud server, that a first DCS logic circuit object and a second DCS logic circuit object are available according to the ML application resource request via the DCS virtual machine 802

Creating, by the PaaS cloud server, a first DCS service object and a second DCS service object via the DCS object management module and pair, by the PaaS cloud server, the first DCS service object and the second DCS service object with the first DCS logic circuit object and the second DCS logic circuit object respectively  803

Binding, by the PaaS cloud server, the first DCS service object and the second DCS service object with an ML application of the client via the DCS object management module  804

Receiving, by the PaaS cloud server, an ML application datum from the ML application via the DCS virtual machine  805

Dividing, by the PaaS cloud server, the ML application datum into a first part ML application datum and a second part ML application datum according to the first DCS service object and the second DCS service object via the DCS virtual machine  806

Inputting, by the PaaS cloud server, the first part ML application datum and the second part ML application datum into the first part logic circuit corresponding to the first DCS service object and the second part logic circuit corresponding to the second DCS service object respectively via the DCS virtual machine according to the pairing of the first DCS service object with the first DCS logic circuit object and the pairing of the second DCS service object with the second DCS logic circuit object  807

Transmitting, by the PaaS cloud server, the first ML data storage information and the second ML data storage information to the ML application via the DCS virtual machine  808

| Retrieving, by the PaaS cloud server, the first ML data storage information and the second ML data storage information of the ML application via the DPT virtual machine     809 |

| Determining, by the PaaS cloud server, that a first DPT logic circuit object and a second DPT logic circuit object are available according to the first ML data storage information and the second ML data storage information via the DPT virtual machine     810 |

| Creating, by the PaaS cloud server, a first DPT service object and a second DPT service object via the DPT object management module, and pair, by the PaaS cloud server, the first DPT service object and the second DPT service object with the first DPT logic circuit object and the second DPT logic circuit object respectively     811 |

| Binding, by the PaaS cloud server, the first DPT service object and the second DPT service object with the ML application of the client via the DPT object management module     812 |

| Retrieving, by the PaaS cloud server, the first compressed ML application datum and the second compressed ML application datum from the first compression database and the second compression database respectively via the DPT virtual machine according to the first ML data storage information and the second ML data storage information     813 |

| Inputting, by the PaaS cloud server, the first compressed ML application datum and the second compressed ML application datum into the first part logic circuit and the second part logic circuit of the second FPGA circuit corresponding to the first DPT logic circuit object and the second DPT logic circuit object respectively via the DPT virtual machine according to the pairing of the first DPT service object with the first DPT logic circuit object and the pairing of the second DPT service object with the second DPT logic circuit object     814 |

| Transmitting, by the PaaS cloud server, the ML model to the ML application via the DPT virtual machine     815 |

FIG. 8B

PLATFORM AS A SERVICE CLOUD SERVER AND MACHINE LEARNING DATA PROCESSING METHOD THEREOF

PRIORITY

This application claims priority to Taiwan Patent Application No. 106140755 filed on Nov. 23, 2017, which is hereby incorporated by reference in its entirety.

FIELD

The present invention relates to a platform as a service (PaaS) cloud server and a machine learning data processing method thereof. More particularly, the present invention relates to a PaaS cloud server and a machine learning data processing method thereof that are capable sharing field-programmable gate array (FPGA) circuits.

BACKGROUND

Cloud computing, as one of main technologies currently developed in network service, utilizes a server side and hardware connected via network to accomplish various data computation or software service required by a client side, and it may even provide the client side with a platform for software development. In this way, the hardware cost at the client side can be reduced remarkably, and meanwhile the production efficiency at the client side can be improved effectively. Applications relevant to machine learning are the mainstream of the development.

Specifically, cloud computing systems that are usually applied to machine learning (ML) currently mainly include an Elastic Compute Cloud (EC2) provided by the Amazon® corporation and a Tensorflow® cloud system provided by the Google® corporation. The EC2 provided by the Amazon Inc. mainly utilizes several clusters of graphic processing units (GPUs) or central processing units (CPUs) to process machine learning data, and the Tensorflow® cloud system provided by the Google® corporation mainly utilizes self-made Tensorflow® processing units to process machine learning data.

Moreover, the machine learning cloud computation systems currently provided by companies mainly takes a low-level Infrastructure as a Service (IaaS) as the system architecture, and provides independent processing unit hardware for different client sides. Thus, the client side can create a machine learning application environment thereof depending on its requirements for data categories, thereby optimizing machine learning data processing.

However, for the machine learning cloud computing system based on the IaaS system, the data processing performance thereof is positively proportional to the number of hardware. Therefore, in order to obtain better performance, the hardware cost required will be increased greatly. On the other hand, as the number of part hardware (e.g., GPUs) increases, the power consumption also increases sharply. Therefore, the conventional machine learning cloud computing system based on the IaaS system tends to have the problem of a high cost and high power consumption.

Accordingly, an urgent need exists in the art to establish the machine learning cloud computing environment on another system architecture so as to reduce the hardware cost of the companies and meanwhile reduce the excessive consumption of resources.

SUMMARY

The disclosure includes a machine learning (ML) data processing method for a platform as a service (PaaS) cloud server. The PaaS cloud server executes a data compression and storing (DCS) object management module and a DCS virtual machine. The DCS virtual machine controls a first field-programmable gate array (FPGA) circuit.

The ML data processing method may comprise: receiving, by the PaaS cloud server, an ML application resource request of a client via the DCS virtual machine; determining, by the PaaS cloud server, that a first DCS logic circuit object is available according to the ML application resource request via the DCS virtual machine, wherein the first DCS logic circuit object corresponds to a first part logic circuit of the first FPGA circuit; creating, by the PaaS cloud server, a first DCS service object via the DCS object management module and pairing, by the PaaS cloud server, the first DCS service object with the first DCS logic circuit object; binding, by the PaaS cloud server, the first DCS service object with an ML application of the client via the DCS object management module.

Moreover, the ML data processing method can further comprise: receiving, by the PaaS cloud server, an ML application datum from the ML application via the DCS virtual machine; inputting, by the PaaS cloud server, the ML application datum into the first part logic circuit corresponding to the first DCS service object via the DCS virtual machine according to the pairing of the first DCS service object with the first DCS logic circuit object so that the first part logic circuit compresses the ML application datum into a compressed ML application datum and stores the compressed ML application datum into a first compression database to generate a piece of ML data storage information; and transmitting, by the PaaS cloud server, the ML data storage information to the ML application via the DCS virtual machine.

The disclosure also includes a PaaS cloud server for machine learning (ML), which comprises a transmission interface and a processor. The transmission interface is configured to connect with a first FPGA circuit. The processor is configured to execute a DCS object management module and a DCS virtual machine, and control the first FPGA circuit via the DCS virtual machine. The DCS virtual machine comprises a DCS processing module.

The DCS processing module may be configured to: receive an ML application resource request of a client; and determine that a first DCS logic circuit object is available according to the ML application resource request, wherein the first DCS logic circuit object corresponds to a first part logic circuit of the first FPGA circuit. The DCS object management module is configured to: create a first DCS service object and pair the first DCS service object with the first DCS logic circuit object; and bind the first DCS service object with an ML application of the client.

The DCS processing module may be further configured to: receive an ML application datum from the ML application; input the ML application datum into the first part logic circuit corresponding to the first DCS service object according to the pairing of the first DCS service object with the first DCS logic circuit object so that the first part logic circuit compresses the ML application datum into a compressed ML application datum and stores the compressed ML application datum into a first compression database to generate a piece of ML data storage information; and transmit the ML data storage information to the ML application.

The invention further includes an ML data processing method for a PaaS cloud server. The PaaS cloud server executes a DCS object management module and a DCS virtual machine. The DCS virtual machine controls a first FPGA circuit. The ML data processing method comprises:

receiving, by the PaaS cloud server, an ML application resource request of a client via the DCS virtual machine; determining, by the PaaS cloud server, that a first DCS logic circuit object and a second DCS logic circuit object are available according to the ML application resource request via the DCS virtual machine, wherein the first DCS logic circuit object and the second DCS logic circuit object correspond to a first part logic circuit and a second part logic circuit of the first FPGA circuit respectively.

The ML data processing method may comprise: creating, by the PaaS cloud server, a first DCS service object and a second DCS service object via the DCS object management module and pairing, by the PaaS cloud server, the first DCS service object and the second DCS service object with the first DCS logic circuit object and the second DCS logic circuit object respectively; binding, by the PaaS cloud server, the first DCS service object and the second DCS service object with an ML application of the client via the DCS object management module; receiving, by the PaaS cloud server, an ML application datum from the ML application via the DCS virtual machine; dividing, by the PaaS cloud server, the ML application datum into a first part ML application datum and a second part ML application datum according to the first DCS service object and the second DCS service object via the DCS virtual machine.

Thereafter, the ML data processing method can further comprise: inputting, by the PaaS cloud server, the first part ML application datum and the second part ML application datum into the first part logic circuit corresponding to the first DCS service object and the second part logic circuit corresponding to the second DCS service object respectively via the DCS virtual machine according to the pairing of the first DCS service object with the first DCS logic circuit object and the pairing of the second DCS service object with the second DCS logic circuit object, wherein the first part logic circuit compresses the first part ML application datum into a first compressed ML application datum and stores the first compressed ML application datum into a first compression database to generate a piece of first ML data storage information, and the second part logic circuit compresses the second part ML application datum into a second compressed ML application datum and stores the second compressed ML application datum into a second compression database to generate a piece of second ML data storage information; and transmitting, by the PaaS cloud server, the first ML data storage information and the second ML data storage information to the ML application via the DCS virtual machine.

The disclosure additionally includes a PaaS cloud server for machine learning (ML), which comprises a transmission interface and a processor. The transmission interface is configured to connect with a first field-programmable gate array (FPGA) circuit. The processor is configured to execute a DCS object management module and a DCS virtual machine, and control the first FPGA circuit via the DCS virtual machine. The DCS virtual machine comprises a DCS processing module. The DCS processing module is configured to: receive an ML application resource request of a client; and determine that a first DCS logic circuit object and a second DCS logic circuit object are available according to the ML application resource request, wherein the first DCS logic circuit object and the second DCS logic circuit object correspond to a first part logic circuit and a second part logic circuit of the first FPGA circuit respectively. The DCS object management module is configured to: create a first DCS service object and a second DCS service object, and pair the first DCS service object and the second DCS service object with the first DCS logic circuit object and the second DCS logic circuit object respectively; and bind the first DCS service object and the second DCS service object with an ML application of the client.

The DCS processing module may be further configured to: receive an ML application datum from the ML application; divide the ML application datum into a first part ML application datum and a second part ML application datum according to the first DCS service object and the second DCS service object; input the first part ML application datum and the second part ML application datum into the first part logic circuit corresponding to the first DCS service object and the second part logic circuit corresponding to the second DCS service object respectively according to the pairing of the first DCS service object with the first DCS logic circuit object and the pairing of the second DCS service object with the second DCS logic circuit object, wherein the first part logic circuit compresses the first part ML application datum into a first compressed ML application datum and stores the first compressed ML application datum into a first compression database to generate a piece of first ML data storage information, and the second part logic circuit compresses the second part ML application datum into a second compressed ML application datum and stores the second compressed ML application datum into a second compression database to generate a piece of second ML data storage information; and transmit the first ML data storage information and the second ML data storage information to the ML application.

BRIEF DESCRIPTION OF THE DRAWINGS

FIG. 7 is a flowchart diagram of a machine learning data processing method according to a seventh embodiment of the present invention; and FIG. 8A to FIG. 8B are flowchart diagrams of a machine learning data processing method according to an eighth embodiment of the present invention.

DETAILED DESCRIPTION

In the following description, the present invention will be explained with reference to certain example embodiments thereof. However, these example embodiments are not intended to limit the present invention to any particular example, embodiment, environment, applications or implementations described in these example embodiments. Therefore, description of these example embodiments is only for purpose of illustration rather than to limit the present invention.

In the following embodiments and the attached drawings, elements unrelated to the present invention are omitted from depiction; and dimensional relationships among individual elements in the attached drawings are illustrated only for ease of understanding, but not to limit the actual scale.

Figure 1A:
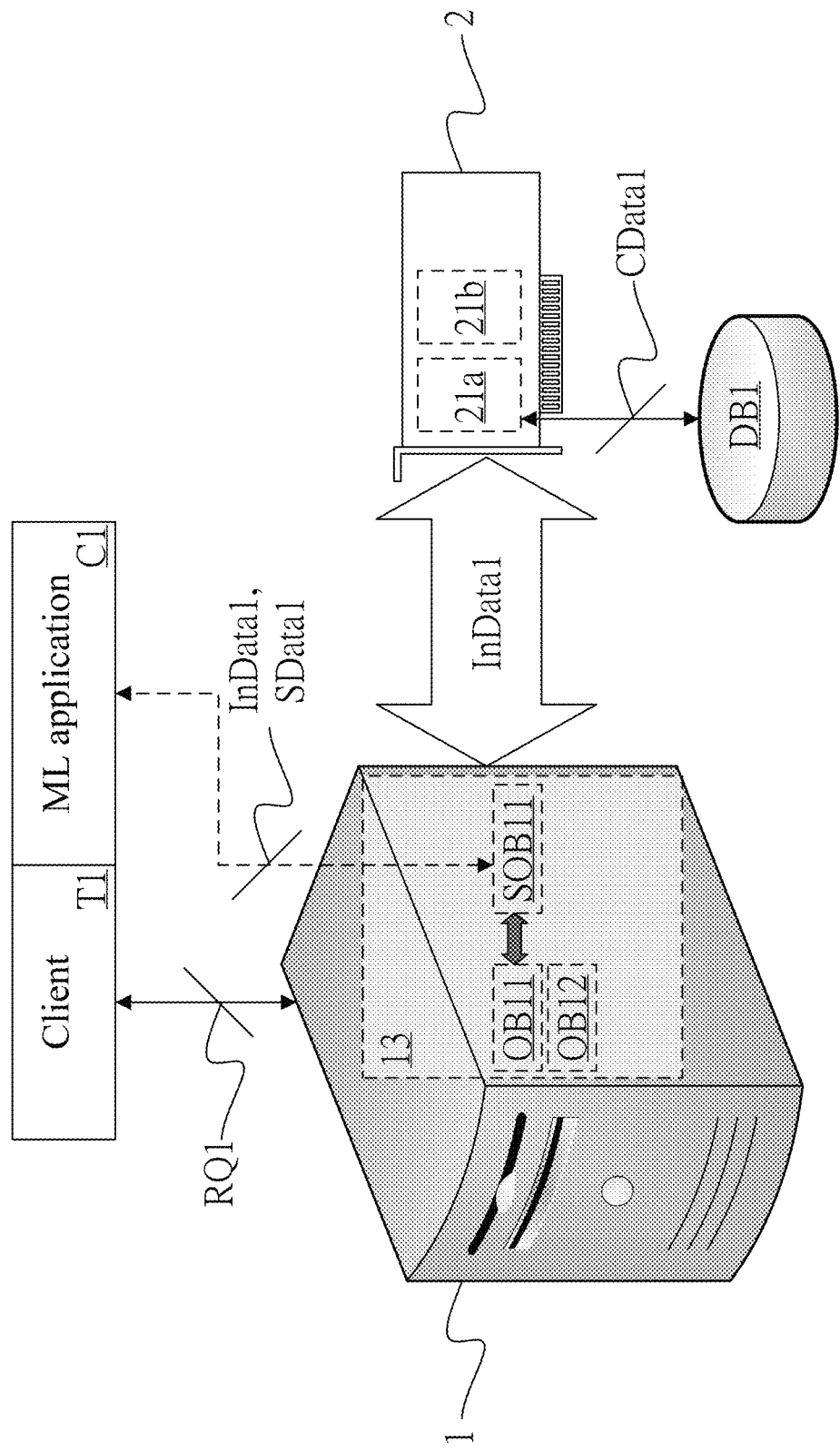
FIG. 1A is a schematic view illustrating the operation of a PaaS cloud server according to a first embodiment of the present invention.
Figure 1B:
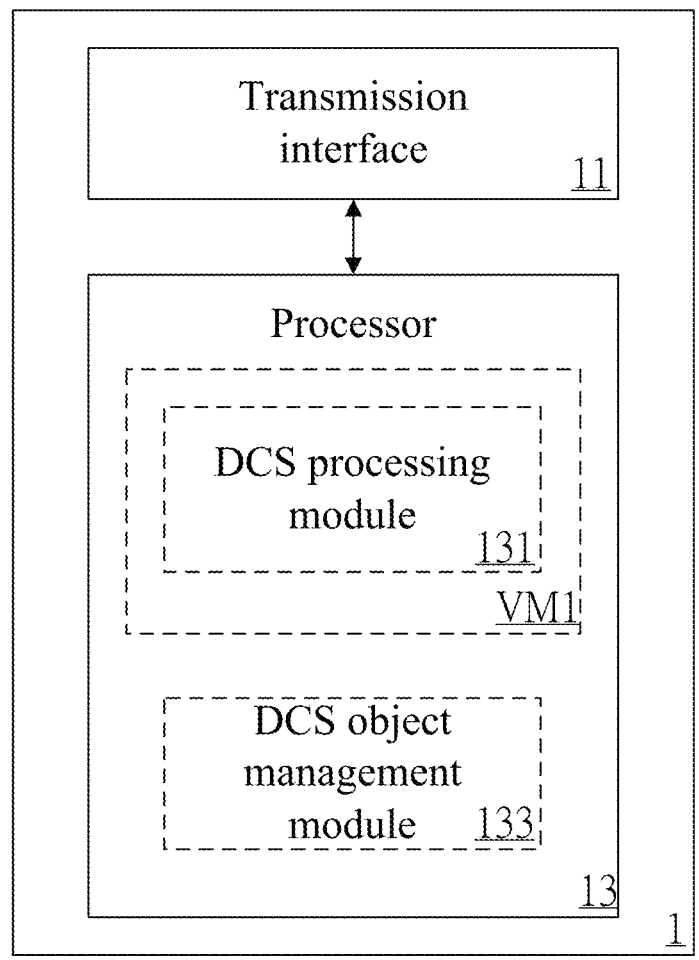
FIG. 1B is a block diagram of the PaaS cloud server according to the first embodiment of the present invention.

Please refer to FIG. 1A and FIG. 1B together. FIG. 1A is a schematic view illustrating the operation of a platform as a service (PaaS) cloud server 1 according to a first embodiment of the present invention, and FIG. 1B is a block diagram of the PaaS cloud server 1 according to the first embodiment of the present invention. The PaaS cloud server 1 comprises a transmission interface 11 and a processor 13. The transmission interface 11 connects with a field-programmable gate array (FPGA) circuit 2. The processor 13 executes a data compression and storing (DCS) object management module 133 and a DCS virtual machine VM1, and controls the FPGA circuit 2 via the DCS virtual machine VM1.

First it shall be appreciated that, the transmission interface 11 and the processor 13 are electrically connected with each other. The processor 13 may be any of a central processing unit (CPU), a graphics processing unit (GPU), a micro processor, a control element, other hardware circuit elements capable of executing relevant instructions or other computing circuits that shall be appreciated by those skilled in the art based on the disclosure of the present invention.

Moreover, the FPGA circuit 2 may exchange data with the PaaS cloud server 1 via a bus (e.g., the transmission interface 11 as a PCIe slot) or a combination of a bus and a network (e.g., the transmission interface 11 as a network card). Additionally, the FPGA circuit 2 may be first divided into a plurality of part logic circuits 21a to 21b capable of computing independently due to the characteristic of being programmable of the FPGA circuit 2. Then, the DCS virtual machine VM1 configures a plurality of corresponding logic circuit objects OB11 to OB12 respectively for the plurality of part logic circuits 21a to 21b for the subsequent use and operation by the part logic circuits 21a to 21b of the FPGA circuit 2.

Specifically, in the first embodiment, the DCS virtual machine VM1 comprises a DCS processing module 131. When a client T1 needs to use a machine learning (ML) application on the PaaS cloud server 1 and needs to operate the FPGA circuit 2 to process the ML data by using the PaaS cloud server 1, the client T1 transmits an ML application resource request RQ1 to the PaaS cloud server 1.

On the other hand, after the PaaS cloud server 1 receives the ML application resource request RQ1 of the client T1 via the DCS processing module 131 of the DCS virtual machine VM1, the PaaS cloud server 1 first determines whether any logic circuit object unused is available. In other words, the PaaS cloud server 1 determines whether any corresponding part logic circuit in the FPGA circuit 2 is not used. In the first embodiment, the DCS processing module 131 determines that a first logic circuit object OB11 is not used, and wherein the first logic circuit object OB11 corresponds to a first part logic circuit 21a of the FPGA circuit 2.

Next, the DCS object management module 133 creates a first DCS service object SOB11, and pairs the first DCS service object SOB11 with the first logic circuit object OB11. Thereafter, the DCS object management module 133 binds the first DCS service object SOB11 with an ML application C1 of the client T1. It shall be particularly appreciated that, the binding herein is mainly used to bind the service object with the application so that the service object and the application share environment variables and can access corresponding parameters mutually.

Thereafter, the DCS processing module 131 of the DCS virtual machine VM1 receives an ML application datum InDate1 from the ML application C1, and inputs the ML application data InDate1 into the first part logic circuit 21a corresponding to the first logic circuit object OB11 via the DCS virtual machine VM1 according to the pairing of the first DCS service object SOB11 and the first logic circuit object OB11.

In this way, the first part logic circuit 21a can compress the ML application datum InData1 into a compressed ML application datum CData1 and stores the compressed ML application datum CData1 into a first compression database DB1 to generate a piece of ML data storage information SData1. The ML data storage information SData1 is mainly configured to record an address where the ML application datum CData1 is stored. Finally, the DCS processing module 131 of the DCS virtual machine VM1 transmits the ML data storage information SData1 to the ML application C1 for the subsequent use of the compressed ML datum.

Figure 2A:
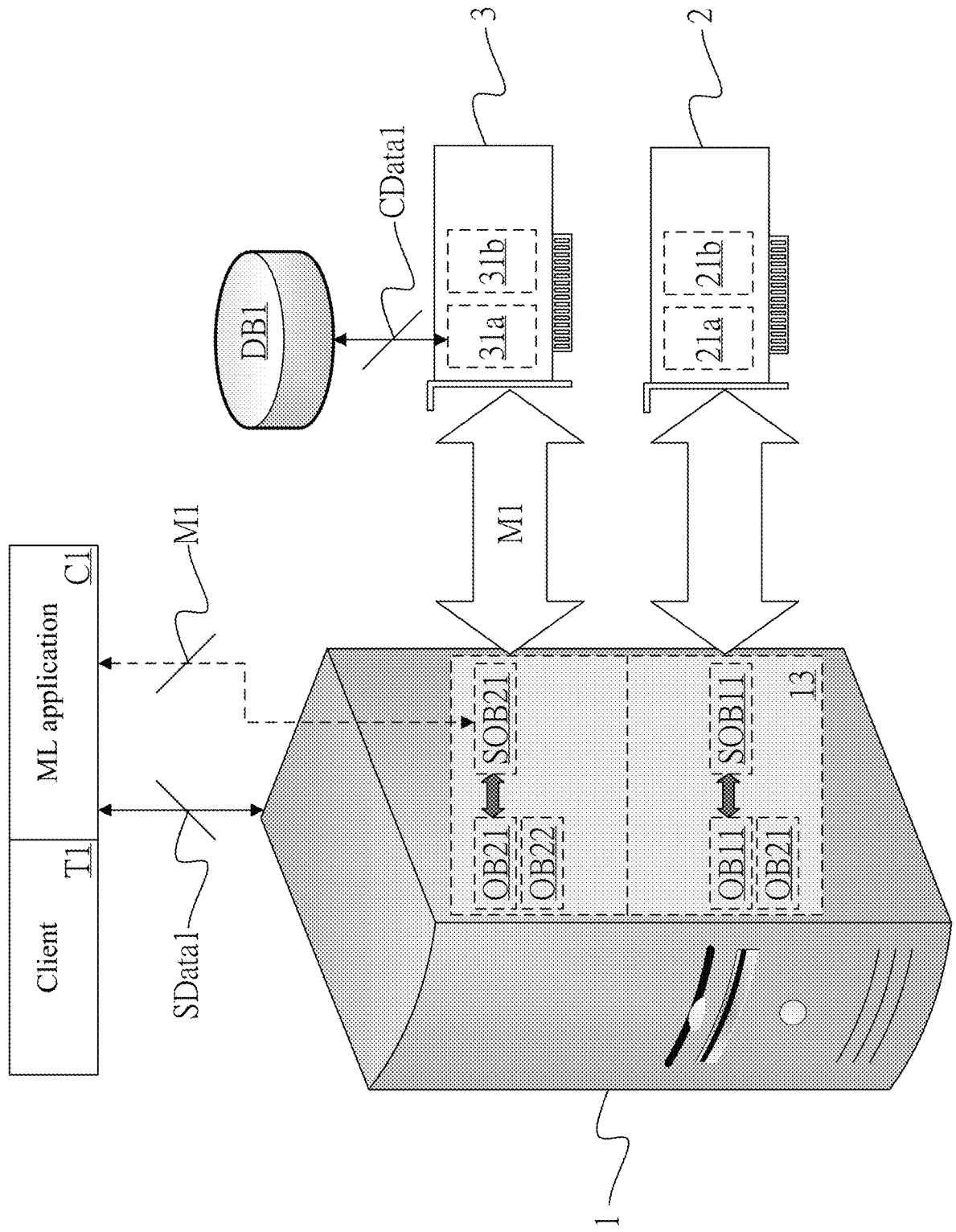
FIG. 2A is a schematic view illustrating the operation of a PaaS cloud server according to a second embodiment of the present invention.
Figure 2B:
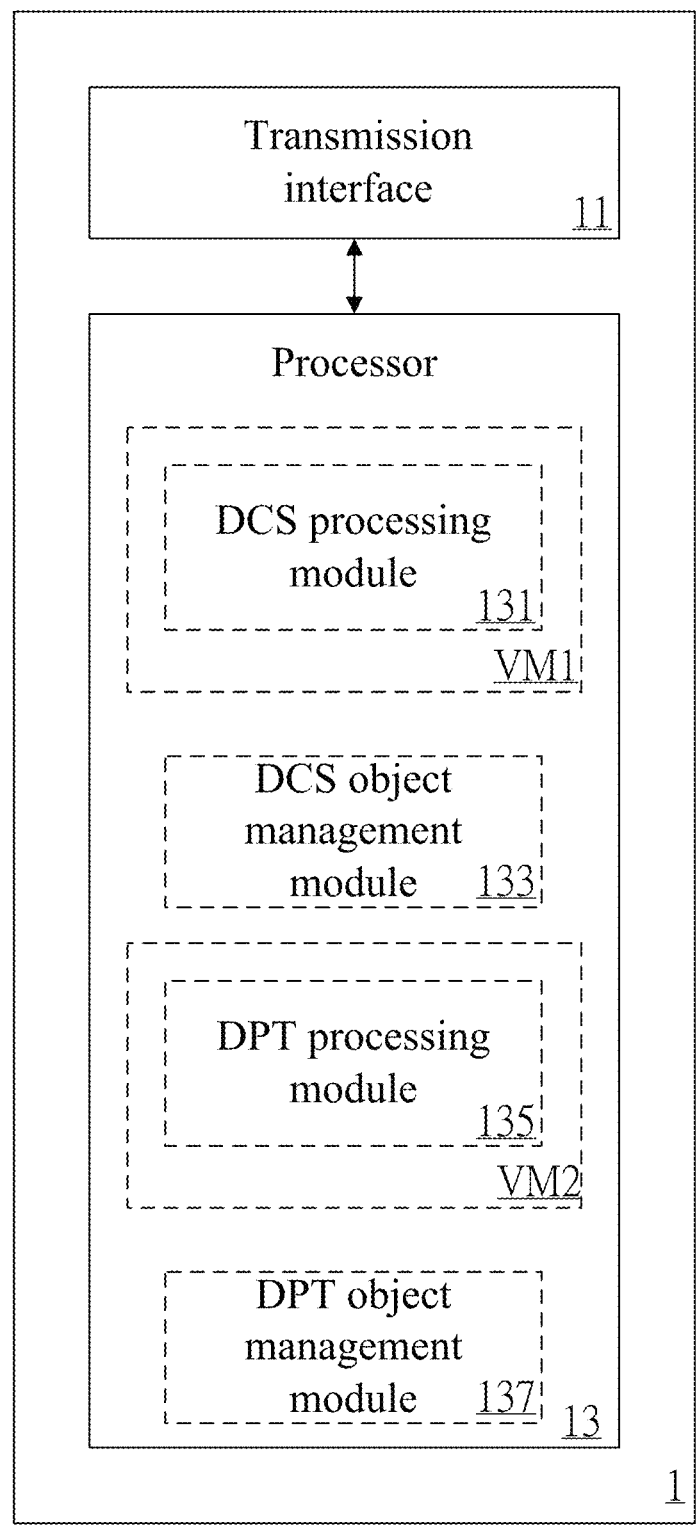
FIG. 2B is a block diagram of the PaaS cloud server according to the second embodiment of the present invention.

Please refer to FIG. 2A and FIG. 2B. FIG. 2A is a schematic view illustrating the operation of a PaaS cloud server 1 according to a second embodiment of the present invention. FIG. 2B is a block diagram of the PaaS cloud server 1 according to the second embodiment of the present invention. The transmission interface 11 further connects with an FPGA circuit 3. The processor 13 further executes a data parallel training (DPT) object management module 137 and a DPT virtual machine VM2, and controls the FPGA circuit 3 via the DPT virtual machine VM2. The second embodiment mainly further illustrates the subsequent use of the compressed ML datum in the first embodiment of the present invention.

Similarly, the FPGA circuit 3 may exchange data with the PaaS cloud server 1 via a bus (e.g., the transmission interface 11 as a PCIe slot) or a combination of a bus and a network (e.g., the transmission interface 11 as a network card). Additionally, the FPGA circuit 3 is divided into a plurality of part logic circuits 31a to 31b capable of computing independently in the second embodiment according to the characteristic of being programmable of the FPGA circuit 3. Then, the DPT virtual machine VM2 configures a plurality of corresponding logic circuit objects OB21 to OB22 respectively for the plurality of part logic circuits 31a to 31b for the subsequent use and operation by the part logic circuits 31a to 31b of the FPGA circuit 3.

Specifically, in the second embodiment, the DTS virtual machine VM2 comprises a DPT processing module 135. When the PaaS cloud server 1 intends to process data relevant to machine learning, the DPT processing module 135 retrieves the ML data storage information SData1 of the ML application C1, and determines whether any logic circuit object unused is available. In other words, the DPT processing module 135 determines whether any corresponding part logic circuit in the FPGA circuit 3 is not used. In the second embodiment, the DPT processing module 135 determines that a first DPT logic circuit object OB21 is available. The first DPT logic circuit object OB21 corresponds to a first part logic circuit 31a of the FPGA circuit 3.

Next, the DPT object management module 137 creates a first DPT service object SOB21, and pairs the first DPT service object SOB21 with the first DPT logic circuit object OB21. Thereafter, the DPT object management module 137 binds the first DPT service object SOB21 with an ML application C1 of the client T1. Similarly, the binding herein is mainly used to bind the service object with the application so that the service object and the application share environment variables and can access corresponding parameters mutually.

Thereafter, because the ML data storage information SData1 records an address where the compressed datum is stored, the DPT processing module 135 can directly retrieve the compressed ML application datum CData1 from the first compression database DB1 according to the ML data storage information SData1, and input the compressed ML application datum CData1 into the first part logic circuit 31a of the FPGA circuit 3 corresponding to the first DPT logic circuit object OB21 according to the pairing of the first DPT service object SOB21 and the first DPT logic circuit object OB21.

In this way, the first part logic circuit 31a of the FPGA circuit 3 can decompress the compressed ML application datum CData1 and accordingly calculate an ML model M1. Finally, the DPT processing module 135 transmits the calculated ML model M1 back to the ML application C1 to complete the creation of the ML model.

Figure 3A:
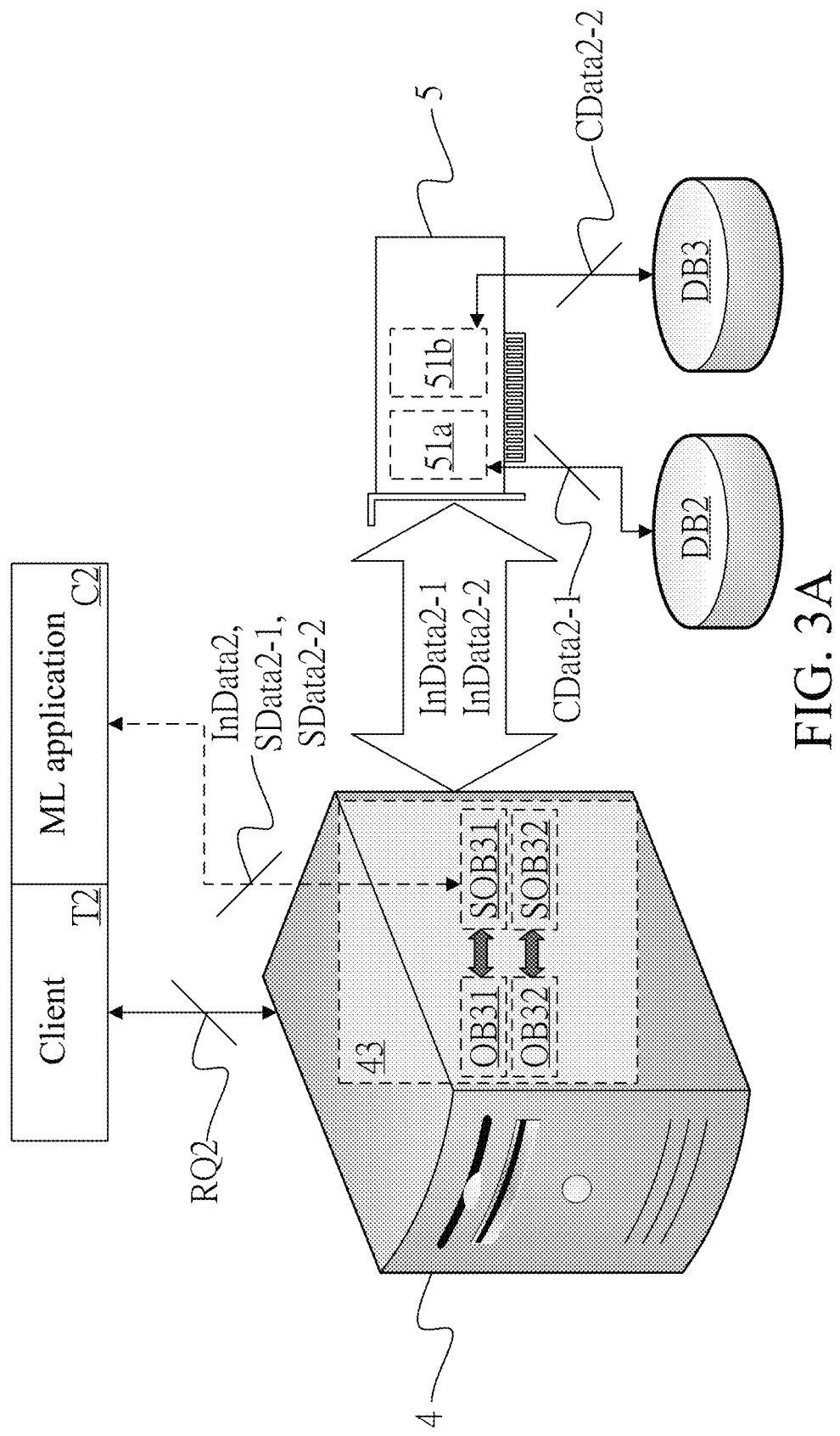
FIG. 3A is a schematic view illustrating the operation of a PaaS cloud server according to a third embodiment of the present invention.
Figure 3B:
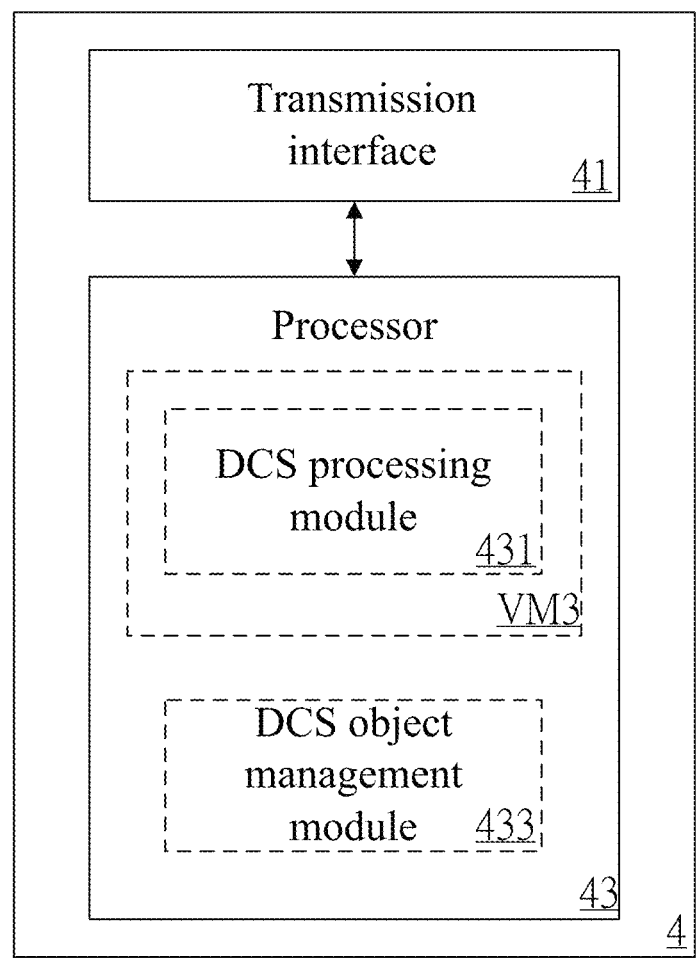
FIG. 3B is a block diagram of the PaaS cloud server according to the third embodiment of the present invention.

Please refer to FIG. 3A and FIG. 3B together. FIG. 3A is a schematic view illustrating the operation of a PaaS cloud server 4 according to a third embodiment of the present invention, and FIG. 3B is a block diagram of the PaaS cloud server 4 according to the third embodiment of the present invention. The PaaS cloud server 4 comprises a transmission interface 41 and a processor 43. The transmission interface 41 connects with an FPGA circuit 5. The processor 43 executes a DCS object management module 433 and a DCS virtual machine VM3, and controls the FPGA circuit 5 via the DCS virtual machine VM3.

Similarly, the FPGA circuit 5 may exchange data with the PaaS cloud server 4 via a bus (e.g., the transmission interface 41 as a PCIe slot) or a combination of a bus and a network (e.g., the transmission interface 41 as a network card). The FPGA circuit 5 may be first divided into a plurality of part logic circuits 51a to 51b capable of computing independently according to the characteristic of being programmable of the FPGA circuit 5. Then, the DCS virtual machine VM3 configures a plurality of corresponding logic circuit objects OB31 to OB32 respectively for the plurality of part logic circuits 51a to 51b for the subsequent use and operation by the part logic circuits 51a to 51b of the FPGA circuit 5.

Specifically, in the fourth embodiment, the DCS virtual machine VM3 comprises a DCS processing module 431. When a client T2 needs to use an ML application on the PaaS cloud server 4 and needs to operate the FPGA circuit 5 to process the ML data by using the PaaS cloud server 4, the client T2 transmits an ML application resource request RQ2 to the PaaS cloud server 4.

On the other hand, after the PaaS cloud server 4 receives the ML application resource request RQ2 of the client T2 via the DCS processing module 431 of the DCS virtual machine VM3, the PaaS cloud server 4 first determines whether any logic circuit object unused is available. In other words, the PaaS cloud server 4 determines whether any corresponding part logic circuit in the FPGA circuit 5 is not used. In the third embodiment, the DCS processing module 431 determines that both of a first logic circuit object OB31 and a second logic circuit object OB32 are not used, and wherein the first logic circuit object OB31 and the second logic circuit object OB32 respectively correspond to a first part logic circuit 51a and a second part logic circuit 51b of the FPGA circuit 5.

Next, the DCS object management module 433 creates a first DCS service object SOB31 and a second DCS service object SOB32, and pairs the first DCS service object SOB31 and the second DCS service object SOB32 with the first logic circuit object OB31 and the second logic circuit object OB32 respectively. Thereafter, the DCS object management module 433 binds the first DCS service object SOB31 and the second service object SOB32 with an ML application C2 of the client T2. Similarly, the binding herein is mainly used to bind the service object with the application so that the service object and the application share environment variables and can access corresponding parameters mutually.

Thereafter, the DCS processing module 431 of the DCS virtual machine VM3 receives an ML application datum InDate2 from the ML application C2, and divides the ML application datum InData2 into a first part ML application datum InData2-1 and a second part ML application datum InData2-2 according to the two service objects (i.e., the first DCS service object SOB31 and the second DCS service object SOB32).

Next, the DCS processing module 431 of the DCS virtual machine VM3 inputs the first part ML application datum InData2-1 into the first part logic circuit 51a corresponding to the first logic circuit object OB31 via the DCS virtual machine VM3 according to the pairing of the first DCS service object SOB31 with the first logic circuit object OB31, and inputs the second part ML application datum InData2-2 into the second part logic circuit 51b corresponding to the second logic circuit object OB32 via the DCS virtual machine VM3 according to the pairing of the second DCS service object SOB32 with the second logic circuit object OB32.

In this way, the first part logic circuit 51a can compress the first part ML application datum InData2-1 into a first compressed ML application datum CDdata2-1 and store the first compressed ML application datum CData2-1 into a first compression database DB2 to generate a piece of first ML data storage information SData2-1. On the other hand, the second part logic circuit 51b can compress the second part ML application datum InData2-2 into a second compressed ML application datum CData2-2 and store the second compressed ML application datum CData2-2 into a second compression database DB3 to generate a piece of second ML data storage information SData2-2.

Similarly, the first ML data storage information SData2-1 is mainly configured to record an address where the first compressed ML application datum CData2-1 is stored, and the second ML data storage information SData2-2 is mainly configured to record an address where the second compressed ML application datum CData2-2 is stored. Finally, the DCS processing module 431 of the DCS virtual machine VM3 transmits the first ML data storage information SData2-1 and the second ML data storage information SData2-2 to the ML application C2 for the subsequent use of the compressed ML datum.

Figure 4A:
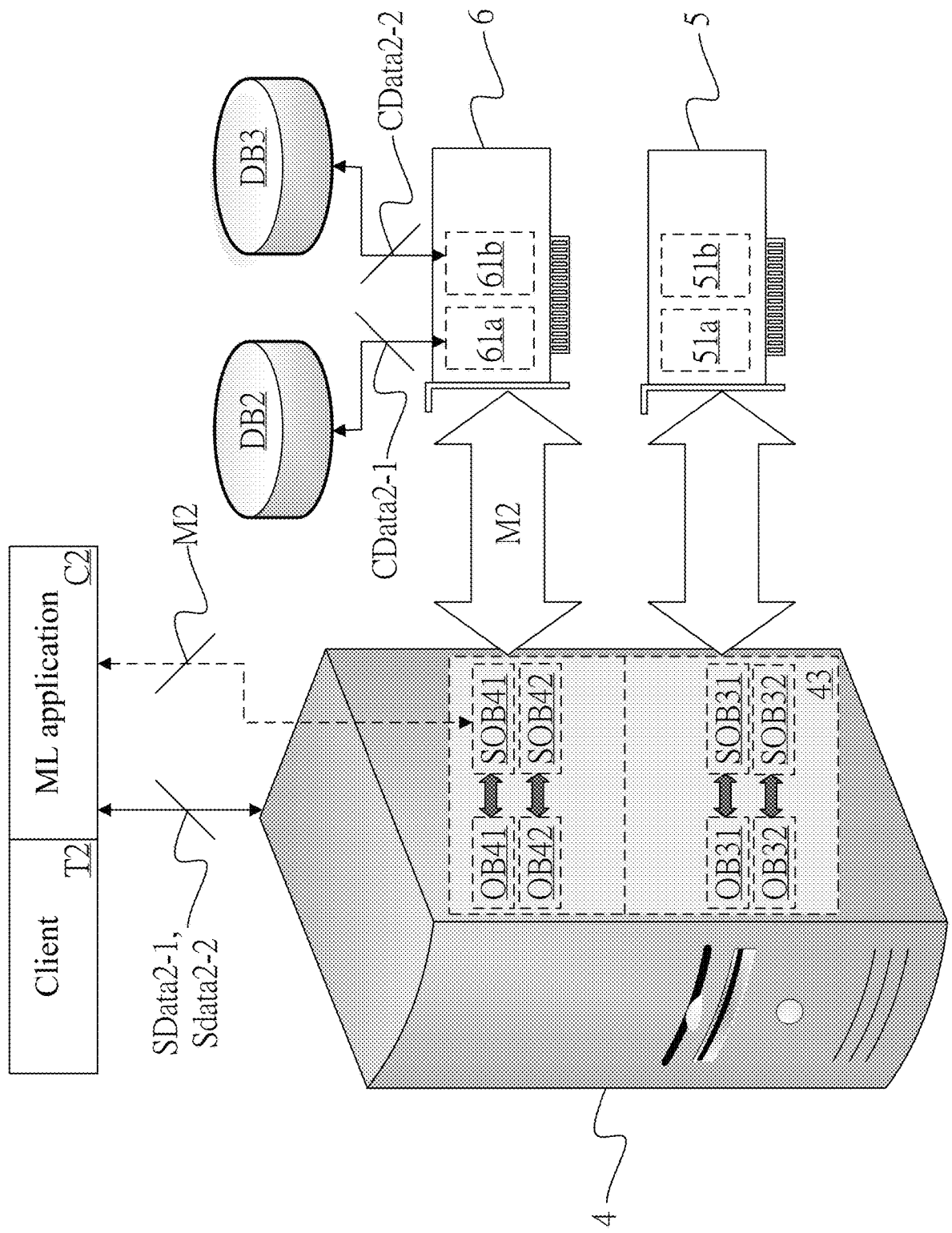
FIG. 4A is a schematic view illustrating the operation of a PaaS cloud server according to a fourth embodiment of the present invention.
Figure 4B:
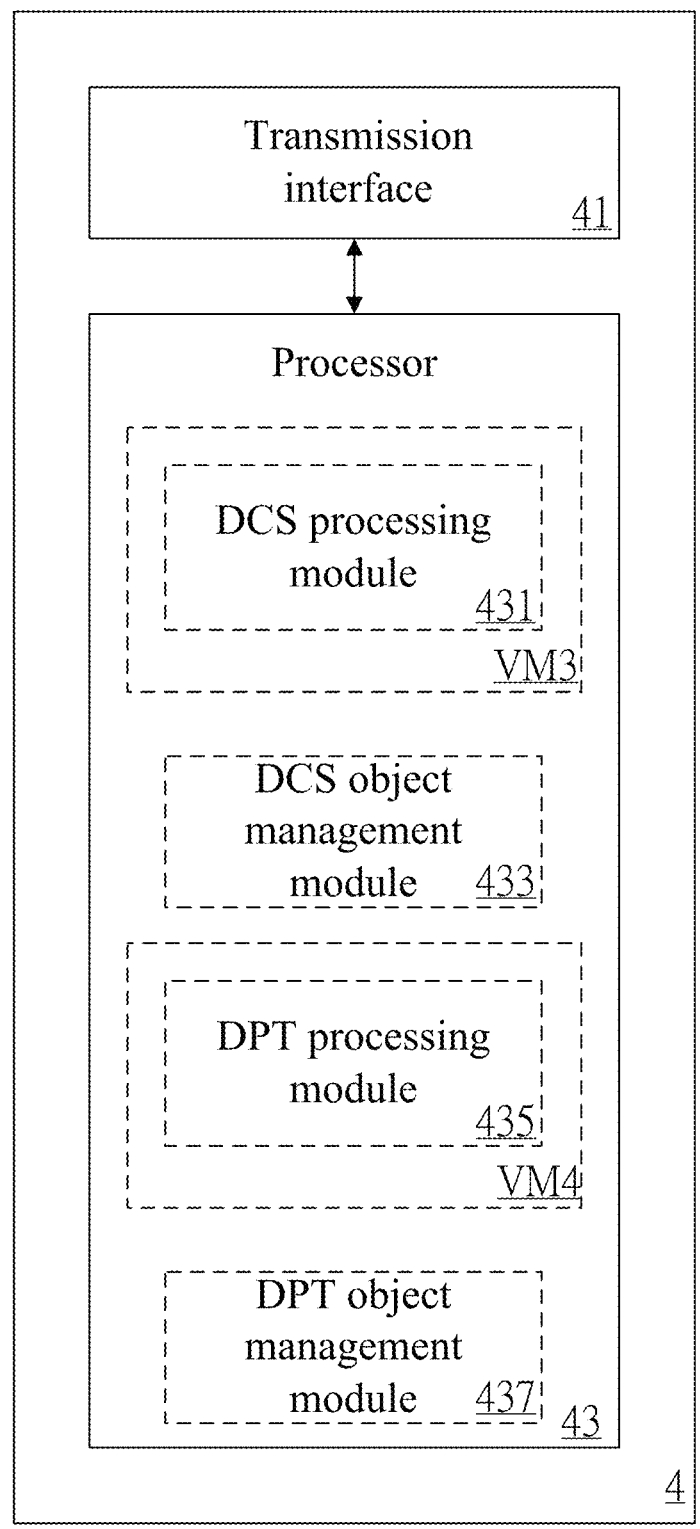
FIG. 4B is a block diagram of the PaaS cloud server according to the fourth embodiment of the present invention.

Please refer to FIG. 4A and FIG. 4B. FIG. 4A is a schematic view illustrating the operation of a PaaS cloud server 4 according to a fourth embodiment of the present invention. FIG. 4B is a block diagram of the PaaS cloud server 4 according to the fourth embodiment of the present invention. The transmission interface 41 further connects with an FPGA circuit 6. The processor 43 further executes a DPT object management module 437 and a DPT virtual machine VM4, and controls the FPGA circuit 6 via the DPT virtual machine VM4. The fourth embodiment mainly further illustrates the subsequent use of the compressed ML datum in the third embodiment of the present invention.

Similarly, the FPGA circuit 6 may exchange data with the PaaS cloud server 4 via a bus (e.g., the transmission interface 41 as a PCIe slot) or a combination of a bus and a network (e.g., the transmission interface 41 as a network card). Additionally, the FPGA circuit 6 is divided into a plurality of part logic circuits 61*a* to 61*b* capable of computing independently in the fourth embodiment according to the characteristic of being programmable of the FPGA circuit 6. Then, the DPT virtual machine VM4 configures a plurality of corresponding logic circuit objects OB41 to OB42 respectively for the plurality of part logic circuits 61*a* to 61*b* for the subsequent use and operation by the part logic circuits 61*a* to 61*b* of the FPGA circuit 6.

Specifically, in the fourth embodiment, the DPT virtual machine VM4 comprises a DPT processing module 435. When the PaaS cloud server 4 intends to process data relevant to machine learning, the DPT processing module 435 retrieves the first ML data storage information SData2-1 and the second ML data storage information SData2-2 of the ML application C2, and determines whether any logic circuit object unused is available. In other words, the DPT processing module 435 determines whether any corresponding part logic circuit in the FPGA circuit 6 is not used.

It shall be particularly appreciated that, because the same number of DPT logic circuit objects need to be used for different number of pieces of ML data storage information, in the fourth embodiment, the DPT processing module 435 determines that a first DPT logic circuit object OB41 and a second DPT logic circuit object OB42 are available. The first DPT logic circuit object OB41 and the second DPT logic circuit object respectively correspond to a first part logic circuit 61*a* and a second part logic circuit 61*b* of the FPGA circuit 6.

Next, the DPT object management module 437 creates a first DPT service object SOB41 and a second DPT service object SOB42, and pairs the first DPT service object SOB41 and the second DPT service object SOB42 with the first DPT logic circuit object OB41 and the second DPT logic circuit object OB42 respectively. Thereafter, the DPT object management module 437 binds the first DPT service object SOB41 and the second DPT service object SOB42 with the ML application C2 of the client T2.

Thereafter, because the first ML data storage information SData2-1 records an address where the compressed datum is stored, the DPT processing module 435 can directly retrieve the first compressed ML application datum CData2-1 from the first compression database DB2 according to the ML data storage information SData2-1, and input the first compressed ML application datum CData2-1 into the first part logic circuit 61*a* of the FPGA circuit 6 corresponding to the first DPT logic circuit object OB41 according to the pairing of the first DPT service object SOB41 with the first DPT logic circuit object OB41.

On the other hand, because the second ML data storage information SData2-2 records an address where the compressed datum is stored, the DPT processing module 435 can also directly retrieve the second compressed ML application datum CData2-2 from the second compression database DB3 according to the ML data storage information SData2-2, and input the second compressed ML application datum CData2-2 into the second part logic circuit 61*b* of the FPGA circuit 6 corresponding to the second DPT logic circuit object OB42 according to the pairing of the second DPT service object SOB42 with the second DPT logic circuit object OB42.

In this way, the first part logic circuit 61*a* and the second part logic circuit 61*b* of the FPGA circuit 6 can decompress the first compressed ML application datum CData2-1 and the second compressed ML application datum CData2-2 and accordingly calculate an ML model M2. Finally, the DPT processing module 435 transmits the calculated ML model M2 back to the ML application C2 to complete the creation of the ML model.

It shall be particularly appreciated that, the technology of the present invention mainly utilizes the PaaS cloud server having the FPGA circuit to divide, compress and calculate machine learning data. How to complete the use of the machine learning data and the creation of the models shall be appreciated by those skilled in the art based on the above disclosure, and thus will not be further described herein.

Figure 5:
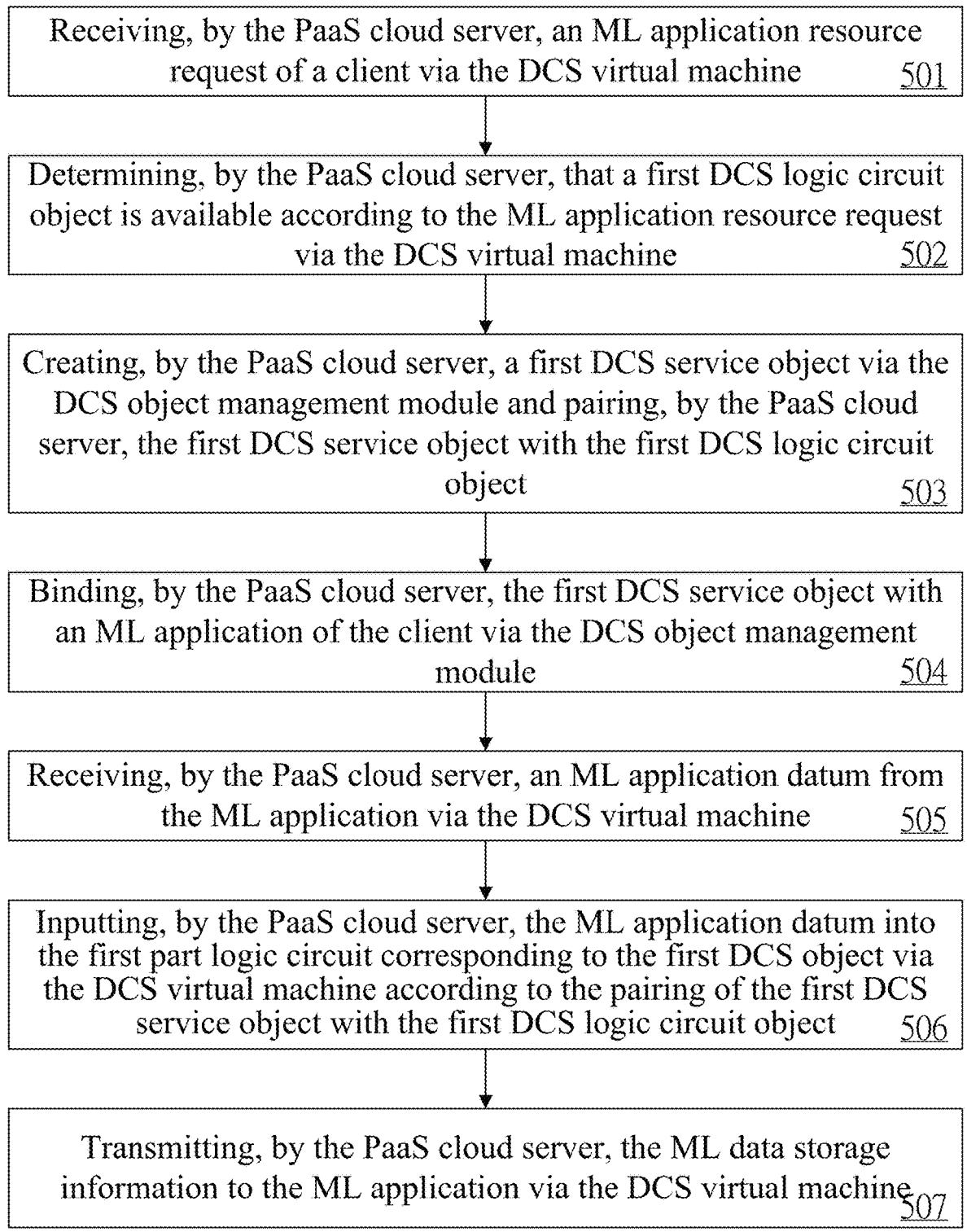
FIG. 5 is a flowchart diagram of a machine learning data processing method according to a fifth embodiment of the present invention.

A fifth embodiment of the present invention is an ML data processing method, and a flowchart diagram thereof is as shown in FIG. 5. The method of the fifth embodiment is for use in a PaaS cloud server (e.g., the PaaS cloud server of the aforesaid embodiments). The PaaS cloud server executes a DCS object management module and a DCS virtual machine. The DCS virtual machine controls an FPGA circuit. Detailed steps of the fifth embodiment are as follows.

First, step 501 is executed to receive, by the PaaS cloud server, an ML application resource request of a client via the DCS virtual machine. Step 502 is executed to determine, by the PaaS cloud server, that a first DCS logic circuit object is available according to the ML application resource request via the DCS virtual machine. The first DCS logic circuit object corresponds to a first part logic circuit of the first FPGA circuit.

Next, step 503 is executed to create, by the PaaS cloud server, a first DCS service object via the DCS object management module and pair, by the PaaS cloud server, the first DCS service object with the first DCS logic circuit object. Step 504 is executed to bind, by the PaaS cloud server, the first DCS service object with an ML application of the client via the DCS object management module.

Thereafter, step 505 is executed to receive, by the PaaS cloud server, an ML application datum from the ML application via the DCS virtual machine. Step 506 is executed to input, by the PaaS cloud server, the ML application datum into the first part logic circuit corresponding to the first DCS service object via the DCS virtual machine according to the pairing of the first DCS service object with the first DCS logic circuit object.

In this way, the first part logic circuit can compress the ML application datum into a compressed ML application datum and store the compressed ML application datum into a first compression database to generate a piece of ML data storage information. Step 507 is executed to transmit, by the PaaS cloud server, the ML data storage information to the ML application via the DCS virtual machine.

Figure 6A:
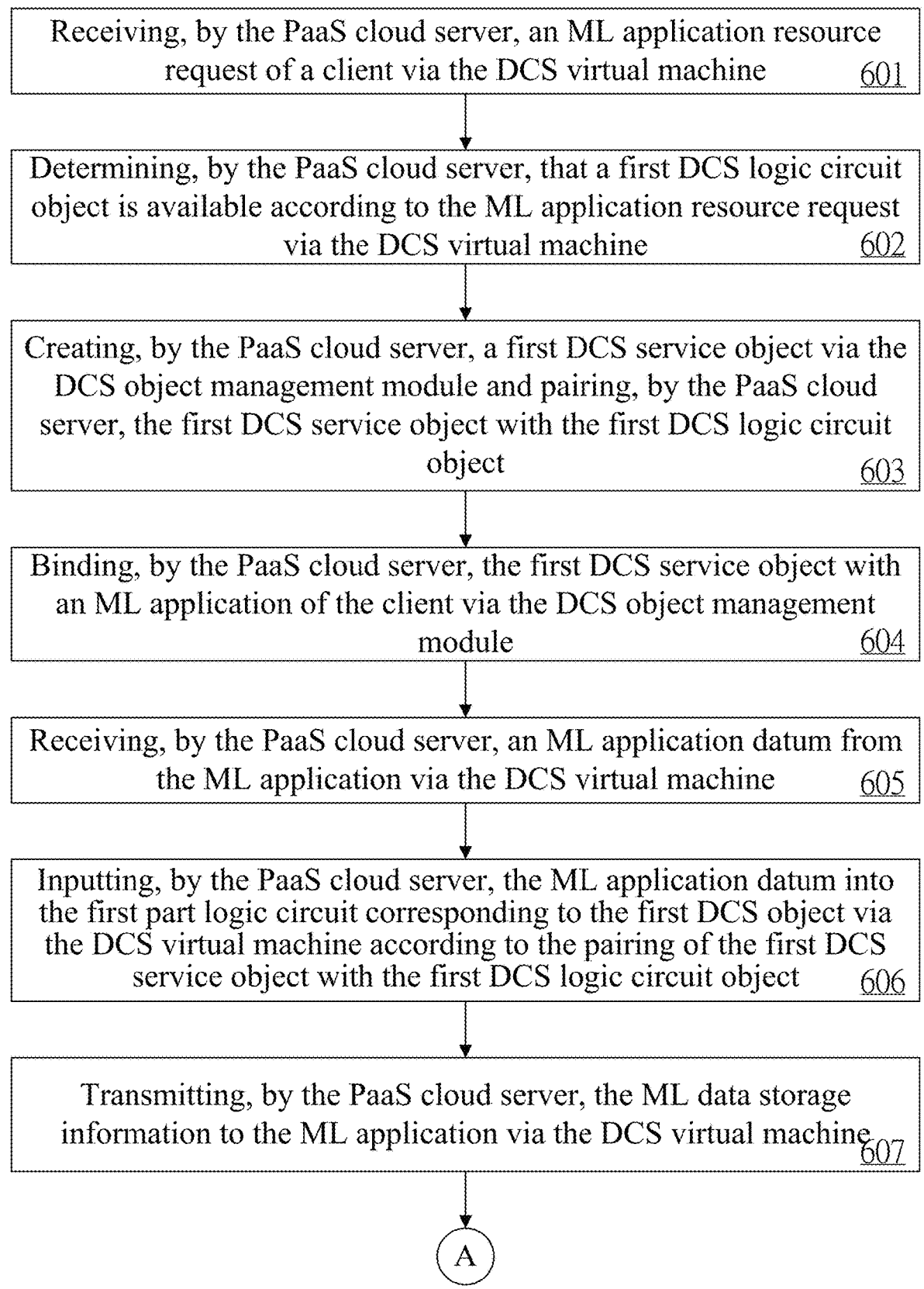
FIG. 6A to FIG. 6B are flowchart diagrams of a machine learning data processing method according to a sixth embodiment of the present invention.
Figure 6B:
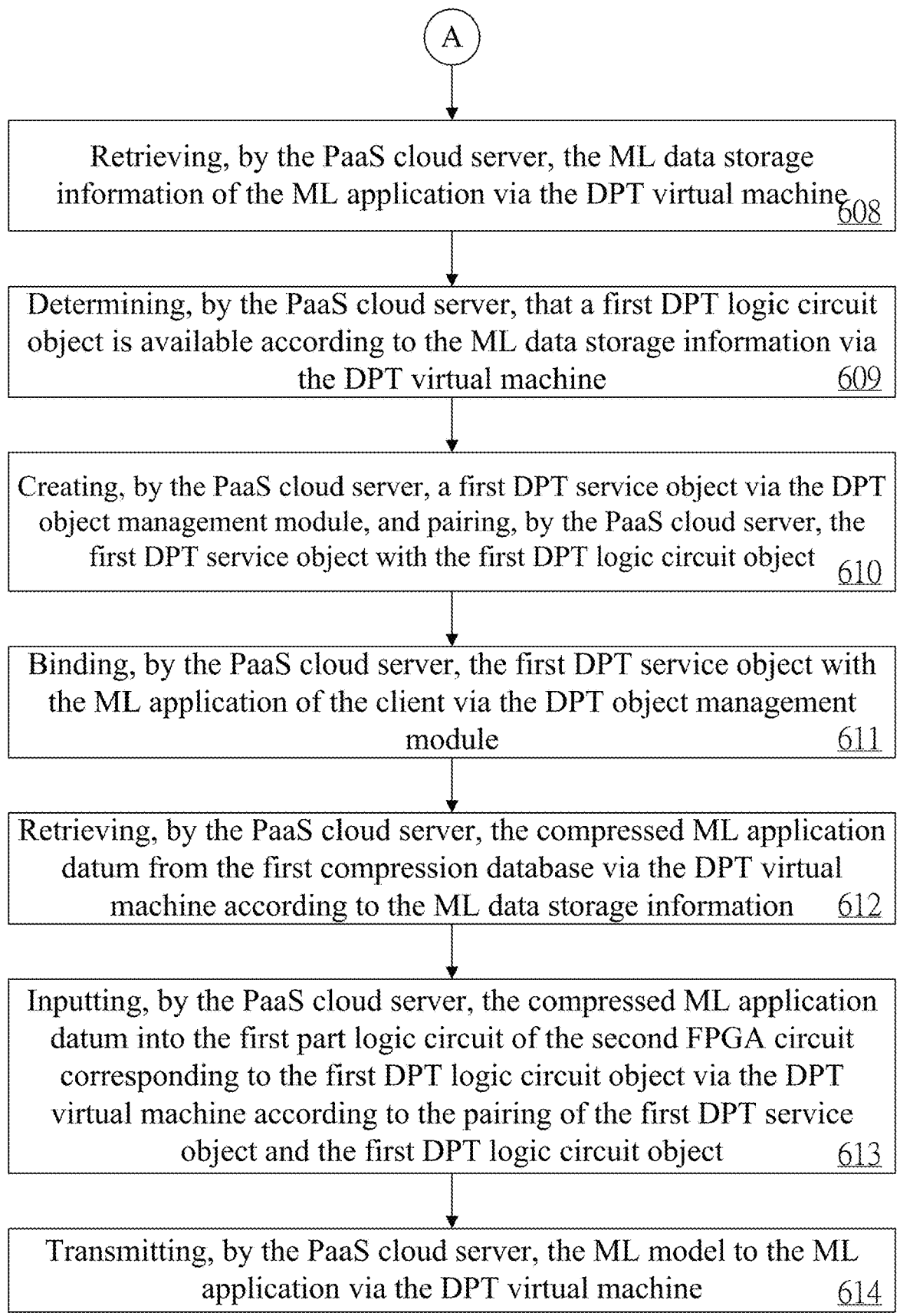

A sixth embodiment of the present invention is an ML data processing method, and flowchart diagrams thereof are as shown in FIG. 6A and FIG. 6B. The method of the sixth embodiment is for use in a PaaS cloud server (e.g., the PaaS cloud server of the aforesaid embodiments). The PaaS cloud server executes a DCS object management module, a DCS virtual machine, a DPT object management module and a DPT virtual machine. The DCS virtual machine controls a first FPGA circuit, and the DPT virtual machine controls a second FPGA circuit. Detailed steps of the sixth embodiment are as follows.

First, step 601 is executed to receive, by the PaaS cloud server, an ML application resource request of a client via the DCS virtual machine. Step 602 is executed to determine, by the PaaS cloud server, that a first DCS logic circuit object is available according to the ML application resource request via the DCS virtual machine. The first DCS logic circuit object corresponds to a first part logic circuit of the first FPGA circuit.

Next, step 603 is executed to create, by the PaaS cloud server, a first DCS service object via the DCS object management module and pair, by the PaaS cloud server, the first DCS service object with the first DCS logic circuit object. Step 604 is executed to bind, by the PaaS cloud server, the first DCS service object with an ML application of the client via the DCS object management module.

Thereafter, step 605 is executed to receive, by the PaaS cloud server, an ML application datum from the ML application via the DCS virtual machine. Step 606 is executed to input, by the PaaS cloud server, the ML application datum into the first part logic circuit corresponding to the first DCS service object via the DCS virtual machine according to the pairing of the first DCS service object with the first DCS logic circuit object.

In this way, the first part logic circuit can compress the ML application datum into a compressed ML application datum and store the compressed ML application datum into a first compression database to generate a piece of ML data storage information. Step 607 is executed to transmit, by the PaaS cloud server, the ML data storage information to the ML application via the DCS virtual machine.

Next, step 608 is executed to retrieve, by the PaaS cloud server, the ML data storage information of the ML application via the DPT virtual machine. Step 609 is executed to determine, by the PaaS cloud server, that a first DPT logic circuit object is available according to the ML data storage information via the DPT virtual machine. The first DPT logic circuit object corresponds to a first part logic circuit of the second FPGA circuit.

Step 610 is executed to create, by the PaaS cloud server, a first DPT service object via the DPT object management module, and pair, by the PaaS cloud server, the first DPT service object with the first DPT logic circuit object. Step 611 is executed to bind, by the PaaS cloud server, the first DPT service object with the ML application of the client via the DPT object management module. Step 612 is executed to retrieve, by the PaaS cloud server, the compressed ML application datum from the first compression database via the DPT virtual machine according to the ML data storage information.

Thereafter, step 613 is executed to input, by the PaaS cloud server, the compressed ML application datum into the first part logic circuit of the second FPGA circuit corresponding to the first DPT logic circuit object via the DPT virtual machine according to the pairing of the first DPT service object and the first DPT logic circuit object. In this way, the first part logic circuit of the second FPGA circuit can decompress the compressed ML application data and accordingly calculate an ML model. Step 614 is executed to transmit, by the PaaS cloud server, the ML model to the ML application via the DPT virtual machine.

A seventh embodiment of the present invention is an ML data processing method, and a flowchart diagram thereof is as shown in FIG. 7. The method of the seventh embodiment is for use in a PaaS cloud server (e.g., the PaaS cloud server of the aforesaid embodiments). The PaaS cloud server executes a DCS object management module and a DCS virtual machine. The DCS virtual machine controls an FPGA circuit. Detailed steps of the seventh embodiment are as follows.

First, step 701 is executed to receive, by the PaaS cloud server, an ML application resource request of a client via the DCS virtual machine. Step 702 is executed to determine, by the PaaS cloud server, that a first DCS logic circuit object and a second DCS logic circuit object are available according to the ML application resource request via the DCS virtual machine. The first DCS logic circuit object and the second DCS logic circuit object respectively correspond to a first part logic circuit and a second part logic circuit of the first FPGA circuit.

Next, step 703 is executed to create, by the PaaS cloud server, a first DCS service object and a second DCS service object via the DCS object management module and pair, by the PaaS cloud server, the first DCS service object and the second DCS service object with the first DCS logic circuit object and the second DCS logic circuit object respectively. Step 704 is executed to bind, by the PaaS cloud server, the first DCS service object and the second DCS service object with an ML application of the client via the DCS object management module.

Step 705 is executed to receive, by the PaaS cloud server, an ML application datum from the ML application via the DCS virtual machine. Step 706 is executed to divide, by the PaaS cloud server, the ML application datum into a first part ML application datum and a second part ML application datum according to the first DCS service object and the second DCS service object via the DCS virtual machine. Step 707 is executed to input, by the PaaS cloud server, the first part ML application datum and the second part ML application datum into the first part logic circuit corresponding to the first DCS service object and the second part logic circuit corresponding to the second DCS service object respectively via the DCS virtual machine according to the pairing of the first DCS service object with the first DCS logic circuit object and the pairing of the second DCS service object with the second DCS logic circuit object.

In this way, the first part logic circuit can compress the first part ML application datum into a first compressed ML application datum and store the first compressed ML application datum into a first compression database to generate a piece of first ML data storage information. On the other hand, the second part logic circuit compresses the second part ML application datum into a second compressed ML application datum and stores the second compressed ML application datum into a second compression database to generate a piece of second ML data storage information. Step 708 is executed to transmit, by the PaaS cloud server, the first ML data storage information and the second ML data storage information to the ML application via the DCS virtual machine.

An eighth embodiment of the present invention is an ML data processing method, and flowchart diagrams thereof are as shown in FIG. 8A and FIG. 8B. The method of the eighth embodiment is for use in a PaaS cloud server (e.g., the PaaS cloud server of the aforesaid embodiments). The PaaS cloud server executes a DCS object management module, a DCS virtual machine, a DPT object management module and a DPT virtual machine. The DCS virtual machine controls a first FPGA circuit, and the DPT virtual machine controls a second FPGA circuit. Detailed steps of the eighth embodiment are as follows.

First, step 801 is executed to receive, by the PaaS cloud server, an ML application resource request of a client via the DCS virtual machine. Step 802 is executed to determine, by the PaaS cloud server, that a first DCS logic circuit object and a second DCS logic circuit object are available according to the ML application resource request via the DCS virtual machine. The first DCS logic circuit object and the second DCS logic circuit object correspond to a first part logic circuit and a second part logic circuit of the first FPGA circuit respectively.

Next, step 803 is executed to create, by the PaaS cloud server, a first DCS service object and a second DCS service object via the DCS object management module and pair, by the PaaS cloud server, the first DCS service object and the second DCS service object with the first DCS logic circuit object and the second DCS logic circuit object respectively. Step 804 is executed to bind, by the PaaS cloud server, the first DCS service object and the second DCS service object with an ML application of the client via the DCS object management module.

Step 805 is executed to receive, by the PaaS cloud server, an ML application datum from the ML application via the DCS virtual machine. Step 806 is executed to divide, by the PaaS cloud server, the ML application datum into a first part ML application datum and a second part ML application datum according to the first DCS service object and the second DCS service object via the DCS virtual machine. Step 807 is executed to input, by the PaaS cloud server, the first part ML application datum and the second part ML application datum into the first part logic circuit corresponding to the first DCS service object and the second part logic circuit corresponding to the second DCS service object respectively via the DCS virtual machine according to the pairing of the first DCS service object with the first DCS logic circuit object and the pairing of the second DCS service object with the second DCS logic circuit object.

In this way, the first part logic circuit can compress the first part ML application datum into a first compressed ML application datum and store the first compressed ML application datum into a first compression database to generate a piece of first ML data storage information. On the other hand, the second part logic circuit compresses the second part ML application datum into a second compressed ML application datum and stores the second compressed ML application datum into a second compression database to generate a piece of second ML data storage information. Step 808 is executed to transmit, by the PaaS cloud server, the first ML data storage information and the second ML data storage information to the ML application via the DCS virtual machine.

Next, step 809 is executed to retrieve, by the PaaS cloud server, the first ML data storage information and the second ML data storage information of the ML application via the DPT virtual machine. Step 810 is executed to determine, by the PaaS cloud server, that a first DPT logic circuit object and a second DPT logic circuit object are available according to the first ML data storage information and the second ML data storage information via the DPT virtual machine. The first DPT logic circuit object and the second DPT logic circuit object correspond to a first part logic circuit and a second part logic circuit of the second FPGA circuit respectively.

Step 811 is executed to create, by the PaaS cloud server, a first DPT service object and a second DPT service object via the DPT object management module, and pair, by the PaaS cloud server, the first DPT service object and the second DPT service object with the first DPT logic circuit object and the second DPT logic circuit object respectively. Step 812 is executed to bind, by the PaaS cloud server, the first DPT service object and the second DPT service object with the ML application of the client via the DPT object management module.

Thereafter, step 813 is executed to retrieve, by the PaaS cloud server, the first compressed ML application datum and the second compressed ML application datum from the first compression database and the second compression database respectively via the DPT virtual machine according to the first ML data storage information and the second ML data storage information. Step 814 is executed to input, by the PaaS cloud server, the first compressed ML application datum and the second compressed ML application datum into the first part logic circuit and the second part logic circuit of the second FPGA circuit corresponding to the first DPT logic circuit object and the second DPT logic circuit object respectively via the DPT virtual machine according to the pairing of the first DPT service object with the first DPT logic circuit object and the pairing of the second DPT service object with the second DPT logic circuit object.

In this way, the first part logic circuit and the second part logic circuit of the second FPGA circuit can accordingly calculate an ML model of the first compressed ML application datum and the second compressed ML application datum. Finally, step 815 is executed to transmit, by the PaaS cloud server, the ML model to the ML application via the DPT virtual machine.

According to the above descriptions, the PaaS cloud server and the machine learning data processing method thereof according to the present invention mainly divide, compress, and store machine learning data according to the characteristic of the FPGA circuit based on the PaaS system, and then utilize multiple logic circuits of another FPGA circuit to process different machine learning data in parallel and accordingly create models. In this way, the hardware cost and power consumption can be remarkably reduced, and meanwhile the efficiency in processing of the machine learning data is improved, thereby solving the problem in the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A machine learning (ML) data processing method for a platform as a service (PaaS) cloud server, the PaaS cloud server executing a data compression and storing (DCS) object management module and a DCS virtual machine, and the DCS virtual machine controlling a first field-programmable gate array (FPGA) circuit, the ML data processing method comprising:
   receiving, by the PaaS cloud server, an ML application resource request of a client via the DCS virtual machine;
   determining, by the PaaS cloud server, that a first DCS logic circuit object is available according to the ML application resource request via the DCS virtual machine, wherein the first DCS logic circuit object corresponds to a first part logic circuit of the first FPGA circuit;

creating, by the PaaS cloud server, a first DCS service object via the DCS object management module and pairing, by the PaaS cloud server, the first DCS service object with the first DCS logic circuit object;

binding, by the PaaS cloud server, the first DCS service object with an ML application of the client via the DCS object management module;

receiving, by the PaaS cloud server, an ML application datum from the ML application via the DCS virtual machine;

inputting, by the PaaS cloud server, the ML application datum into the first part logic circuit corresponding to the first DCS service object via the DCS virtual machine according to the pairing of the first DCS service object with the first DCS logic circuit object so that the first part logic circuit compresses the ML application datum into a compressed ML application datum and stores the compressed ML application datum into a first compression database to generate a piece of ML data storage information; and transmitting, by the PaaS cloud server, the ML data storage information to the ML application via the DCS virtual machine.

2. The ML data processing method of claim 1, wherein the PaaS cloud server further executes a data parallel training (DPT) object management module and a DPT virtual machine, and the DPT virtual machine controls a second FPGA circuit, the ML data processing method further comprising:

retrieving, by the PaaS cloud server, the ML data storage information of the ML application via the DPT virtual machine;

determining, by the PaaS cloud server, that a first DPT logic circuit object is available according to the ML data storage information via the DPT virtual machine, wherein the first DPT logic circuit object corresponds to a first part logic circuit of the second FPGA circuit;

creating, by the PaaS cloud server, a first DPT service object via the DPT object management module, and pairing, by the PaaS cloud server, the first DPT service object with the first DPT logic circuit object;

binding, by the PaaS cloud server, the first DPT service object with the ML application of the client via the DPT object management module;

retrieving, by the PaaS cloud server, the compressed ML application datum from the first compression database via the DPT virtual machine according to the ML data storage information;

inputting, by the PaaS cloud server, the compressed ML application datum into the first part logic circuit of the second FPGA circuit corresponding to the first DPT logic circuit object via the DPT virtual machine according to the pairing of the first DPT service object and the first DPT logic circuit object so that the first part logic circuit of the second FPGA circuit calculates an ML model of the compressed ML application datum; and transmitting, by the PaaS cloud server, the ML model to the ML application via the DPT virtual machine.

3. A machine learning (ML) data processing method for a platform as a service (PaaS) cloud server, the PaaS cloud server executing a data compression and storing (DCS) object management module and a DCS virtual machine, and the DCS virtual machine controlling a first field-programmable gate array (FPGA) circuit, the ML data processing method comprising:

receiving, by the PaaS cloud server, an ML application resource request of a client via the DCS virtual machine;

determining, by the PaaS cloud server, that a first DCS logic circuit object and a second DCS logic circuit object are available according to the ML application resource request via the DCS virtual machine, wherein the first DCS logic circuit object and the second DCS logic circuit object correspond to a first part logic circuit and a second part logic circuit of the first FPGA circuit respectively;

creating, by the PaaS cloud server, a first DCS service object and a second DCS service object via the DCS object management module and pairing, by the PaaS cloud server, the first DCS service object and the second DCS service object with the first DCS logic circuit object and the second DCS logic circuit object respectively;

binding, by the PaaS cloud server, the first DCS service object and the second DCS service object with an ML application of the client via the DCS object management module;

receiving, by the PaaS cloud server, an ML application datum from the ML application via the DCS virtual machine;

dividing, by the PaaS cloud server, the ML application datum into a first part ML application datum and a second part ML application datum according to the first DCS service object and the second DCS service object via the DCS virtual machine;

inputting, by the PaaS cloud server, the first part ML application datum and the second part ML application datum into the first part logic circuit corresponding to the first DCS service object and the second part logic circuit corresponding to the second DCS service object respectively via the DCS virtual machine according to the pairing of the first DCS service object with the first DCS logic circuit object and the pairing of the second DCS service object with the second DCS logic circuit object, wherein the first part logic circuit compresses the first part ML application datum into a first compressed ML application datum and stores the first compressed ML application datum into a first compression database to generate a piece of first ML data storage information, and the second part logic circuit compresses the second part ML application datum into a second compressed ML application datum and stores the second compressed ML application datum into a second compression database to generate a piece of second ML data storage information; and transmitting, by the PaaS cloud server, the first ML data storage information and the second ML data storage information to the ML application via the DCS virtual machine.

4. The ML data processing method of claim 3, wherein the PaaS cloud server further executes a data parallel training (DPT) object management module and a DPT virtual machine, and the DPT virtual machine controls a second FPGA circuit, the ML data processing method further comprising:

retrieving, by the PaaS cloud server, the first ML data storage information and the second ML data storage information of the ML application via the DPT virtual machine;

determining, by the PaaS cloud server, that a first DPT logic circuit object and a second DPT logic circuit object are available according to the first ML data storage information and the second ML data storage information via the DPT virtual machine, wherein the first DPT logic circuit object and the second DPT logic circuit object correspond to a first part logic circuit and a second part logic circuit of the second FPGA circuit respectively;

creating, by the PaaS cloud server, a first DPT service object and a second DPT service object via the DPT object management module, and pairing, by the PaaS cloud server, the first DPT service object and the second DPT service object with the first DPT logic circuit object and the second DPT logic circuit object respectively;

binding, by the PaaS cloud server, the first DPT service object and the second DPT service object with the ML application of the client via the DPT object management module;

retrieving, by the PaaS cloud server, the first compressed ML application datum and the second compressed ML application datum from the first compression database and the second compression database respectively via the DPT virtual machine according to the first ML data storage information and the second ML data storage information;

inputting, by the PaaS cloud server, the first compressed ML application datum and the second compressed ML application datum into the first part logic circuit and the second part logic circuit of the second FPGA circuit corresponding to the first DPT logic circuit object and the second DPT logic circuit object respectively via the DPT virtual machine according to the pairing of the first DPT service object with the first DPT logic circuit object and the pairing of the second DPT service object with the second DPT logic circuit object so that the first part logic circuit and the second part logic circuit of the second FPGA circuit calculate an ML model of the first compressed ML application datum and the second compressed ML application datum; and transmitting, by the PaaS cloud server, the ML model to the ML application via the DPT virtual machine.

5. A platform as a service (PaaS) cloud server for machine learning (ML), comprising:
  a transmission interface, being configured to connect with a first field-programmable gate array (FPGA) circuit; and
  a processor, being configured to execute a data compression and storing (DCS) object management module and a DCS virtual machine, and control the first FPGA circuit via the DCS virtual machine, the DCS virtual machine comprising a DCS processing module;
  wherein the DCS processing module is configured to:
    receive an ML application resource request of a client; and
    determine that a first DCS logic circuit object is available according to the ML application resource request, wherein the first DCS logic circuit object corresponds to a first part logic circuit of the first FPGA circuit;
  wherein the DCS object management module is configured to:
    create a first DCS service object and pair the first DCS service object with the first DCS logic circuit object; and
    bind the first DCS service object with an ML application of the client;
  wherein the DCS processing module is further configured to:
    receive an ML application datum from the ML application;
    input the ML application datum into the first part logic circuit corresponding to the first DCS service object according to the pairing of the first DCS service object with the first DCS logic circuit object so that the first part logic circuit compresses the ML application datum into a compressed ML application datum and stores the compressed ML application datum into a first compression database to generate a piece of ML data storage information; and
    transmit the ML data storage information to the ML application.

6. The PaaS cloud server of claim 5, wherein:
  the transmission interface is further configured to connect with a second FPGA circuit;
  the processor is further configured to execute a data parallel training (DPT) object management module and a DPT virtual machine, and control the second FPGA circuit via the DPT virtual machine, the DPT virtual machine comprising a DPT processing module,
  wherein the DPT processing module is further configured to:
    retrieve the ML data storage information of the ML application; and
    determine that a first DPT logic circuit object is available according to the ML data storage information, wherein the first DPT logic circuit object corresponds to a first part logic circuit of the second FPGA circuit;
  wherein the DPT object management module is further configured to:
    create a first DPT service object, and pair the first DPT service object with the first DPT logic circuit object; and
    bind the first DPT service object with the ML application of the client;
  wherein the DPT processing module is further configured to:
    retrieve the compressed ML application datum from the first compression database according to the ML data storage information;
    input the compressed ML application datum into the first part logic circuit of the second FPGA circuit corresponding to the first DPT logic circuit object according to the pairing of the first DPT service object and the first DPT logic circuit object so that the first part logic circuit of the second FPGA circuit calculates an ML model of the compressed ML application datum; and
    transmit the ML model to the ML application.

7. A platform as a service (PaaS) cloud server for machine learning (ML), comprising:
  a transmission interface, being configured to connect with a first field-programmable gate array (FPGA) circuit; and
  a processor, being configured to execute a data compression and storing (DCS) object management module and a DCS virtual machine, and control the first FPGA circuit via the DCS virtual machine, the DCS virtual machine comprising a DCS processing module;
  wherein the DCS processing module is configured to:
    receive an ML application resource request of a client; and
    determine that a first DCS logic circuit object and a second DCS logic circuit object are available according to the ML application resource request, wherein the first DCS logic circuit object and the second DCS logic circuit object correspond to a first part logic circuit and a second part logic circuit of the first FPGA circuit respectively;

wherein the DCS object management module is configured to:
  create a first DCS service object and a second DCS service object, and pair the first DCS service object and the second DCS service object with the first DCS logic circuit object and the second DCS logic circuit object respectively; and
  bind the first DCS service object and the second DCS service object with an ML application of the client;

wherein the DCS processing module is further configured to:
  receive an ML application datum from the ML application;
  divide the ML application datum into a first part ML application datum and a second part ML application datum according to the first DCS service object and the second DCS service object;
  input the first part ML application datum and the second part ML application datum into the first part logic circuit corresponding to the first DCS service object and the second part logic circuit corresponding to the second DCS service object respectively according to the pairing of the first DCS service object with the first DCS logic circuit object and the pairing of the second DCS service object with the second DCS logic circuit object, wherein the first part logic circuit compresses the first part ML application datum into a first compressed ML application datum and stores the first compressed ML application datum into a first compression database to generate a piece of first ML data storage information, and the second part logic circuit compresses the second part ML application datum into a second compressed ML application datum and stores the second compressed ML application datum into a second compression database to generate a piece of second ML data storage information; and
  transmit the first ML data storage information and the second ML data storage information to the ML application.

8. The PaaS cloud server of claim 7, wherein:
the transmission interface is further configured to connect with a second FPGA circuit;
the processor is further configured to execute a data parallel training (DPT) object management module and a DPT virtual machine, and control the second FPGA circuit via the DPT virtual machine, the DPT virtual machine comprising a DPT processing module, wherein the DPT processing module is configured to:
  retrieve the first ML data storage information and the second ML data storage information of the ML application;
  determine that a first DPT logic circuit object and a second DPT logic circuit object are available according to the first ML data storage information and the second ML data storage information, wherein the first DPT logic circuit object and the second DPT logic circuit object correspond to a first part logic circuit and a second part logic circuit of the second FPGA circuit respectively;

wherein the DPT object management module is further configured to:
  create a first DPT service object and a second DPT service object, and pair the first DPT service object and the second DPT service object with the first DPT logic circuit object and the second DPT logic circuit object respectively;
  bind the first DPT service object and the second DPT service object with the ML application of the client;

wherein the DPT object management module is further configured to:
  retrieve the first compressed ML application datum and the second compressed ML application datum from the first compression database and the second compression database respectively according to the first ML data storage information and the second ML data storage information;
  input the first compressed ML application datum and the second compressed ML application datum into the first part logic circuit and the second part logic circuit of the second FPGA circuit corresponding to the first DPT logic circuit object and the second DPT logic circuit object respectively according to the pairing of the first DPT service object with the first DPT logic circuit object and the pairing of the second DPT service object with the second DPT logic circuit object so that the first part logic circuit and the second part logic circuit of the second FPGA circuit calculate an ML model of the first compressed ML application datum and the second compressed ML application datum; and
  transmit the ML model to the ML application.

* * * * *